(12) United States Patent
Beesley et al.

(10) Patent No.: US 10,323,699 B2
(45) Date of Patent: Jun. 18, 2019

(54) ELECTROMAGNETIC CONNECT/DISCONNECT SYSTEM FOR A VEHICLE

(71) Applicant: Dana Automotive Systems Group, LLC, Maumee, OH (US)

(72) Inventors: Peter A. Beesley, Fort Wayne, IN (US); Randy L. Sommer, Monroeville, IN (US); Kenneth E. Cooper, Toledo, OH (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 335 days.

(21) Appl. No.: 15/196,263

(22) Filed: Jun. 29, 2016

(65) Prior Publication Data
US 2017/0002875 A1    Jan. 5, 2017

Related U.S. Application Data

(60) Provisional application No. 62/187,857, filed on Jul. 2, 2015.

(51) Int. Cl.
| *F16D 27/118* | (2006.01) |
| *F16D 11/14* | (2006.01) |
| *F16D 27/09* | (2006.01) |
| *F16D 27/14* | (2006.01) |
| *F16D 27/01* | (2006.01) |

(52) U.S. Cl.
CPC ............ *F16D 27/118* (2013.01); *F16D 11/14* (2013.01); *F16D 27/09* (2013.01); *F16D 27/01* (2013.01); *F16D 27/14* (2013.01)

(58) Field of Classification Search
None
See application file for complete search history.

(56) References Cited

U.S. PATENT DOCUMENTS

| RE25,299 E | 12/1962 | Rudisch |
| 3,084,776 A | 4/1963 | Rabinow |
| (Continued) | | |

FOREIGN PATENT DOCUMENTS

| DE | 102006004125 A1 | 8/2007 |
| DE | 102007058552 A1 | 6/2009 |
| (Continued) | | |

OTHER PUBLICATIONS

Japanese Patent Office, Japanese Office Action for application 2016-573063, date of drafting Sep. 22, 2017, issued by the Japanese Patent Office.

*Primary Examiner* — Jacob S. Scott
(74) *Attorney, Agent, or Firm* — Marshall & Melhorn, LLC (57) ABSTRACT

An electromagnetic connect/disconnect system with an electromagnet including a coil and a coil housing. The system also includes a rotatable and axially slideable slide ring located between the coil housing and a sliding collar. The slide ring has a radially outer surface and a radially inner surface. The sliding collar has a first portion and a second portion. The first portion is located radially inward from the slide ring and defines a first set of axially extending teeth. The second portion is located radially inward from the first portion. A return spring is located adjacent the sliding collar. An output gear is also included which has a second set of axially extending teeth for selective engagement with the sliding collar.

14 Claims, 7 Drawing Sheets

(56) References Cited

U.S. PATENT DOCUMENTS

| | | |
|---|---|---|
| 3,224,540 A | 12/1965 | Straub |
| 3,307,666 A | 3/1967 | Miller et al. |
| 4,534,455 A | 8/1985 | Fujikawa |
| 4,561,520 A | 12/1985 | Fogelberg |
| 4,719,943 A | 1/1988 | Perach |
| 5,030,181 A | 7/1991 | Keller |
| 5,052,534 A | 10/1991 | Gustin et al. |
| 5,740,895 A | 4/1998 | Bigley |
| 5,752,308 A | 5/1998 | Maley et al. |
| 5,765,671 A | 6/1998 | Endo et al. |
| 5,884,896 A | 3/1999 | Kono et al. |
| 6,109,411 A | 8/2000 | Bigley |
| 6,170,628 B1 | 1/2001 | Bigley |
| 6,178,791 B1 | 1/2001 | Hill et al. |
| 6,231,077 B1 | 5/2001 | Karolek et al. |
| 6,249,418 B1 | 6/2001 | Bergstrom |
| 6,892,845 B2 | 5/2005 | Handa |
| 7,153,228 B2 | 12/2006 | Fujiu et al. |
| 7,325,664 B2 | 2/2008 | Fusegi |
| 7,431,262 B2 | 10/2008 | Sturman et al. |
| 7,780,565 B2 | 8/2010 | Fusegi et al. |
| 7,841,456 B2 | 11/2010 | Pescheck et al. |
| 7,887,450 B2 | 2/2011 | Fusegi et al. |
| 7,892,134 B2 | 2/2011 | Fusegi |
| 8,235,196 B2 | 8/2012 | Kato et al. |
| 8,267,232 B2 * | 9/2012 | Knoblauch ............ F16D 27/004 192/48.2 |
| 8,287,417 B2 | 10/2012 | Sudou et al. |
| 8,348,799 B2 | 1/2013 | Maruyama et al. |
| 8,591,375 B2 | 11/2013 | Maruyama et al. |
| 8,739,952 B2 | 6/2014 | Krafft et al. |
| 8,858,384 B2 | 10/2014 | Fusegi et al. |
| 8,986,151 B2 | 3/2015 | Valente et al. |
| 9,005,069 B2 | 4/2015 | Fusegi et al. |
| 9,815,570 B2 * | 11/2017 | Anderson ............... F16H 19/04 |
| 2002/0008601 A1 | 1/2002 | Yajima et al. |
| 2004/0035665 A1 | 2/2004 | Mochizuki |
| 2005/0279607 A1 | 12/2005 | Fusegi |
| 2006/0219513 A1 | 10/2006 | Organek |
| 2012/0238388 A1 | 9/2012 | Fusegi et al. |
| 2014/0190781 A1 | 7/2014 | Lawson et al. |
| 2015/0184699 A1 * | 7/2015 | Kato .................... F16D 27/118 192/69 |

FOREIGN PATENT DOCUMENTS

| | | |
|---|---|---|
| EP | 1568917 A2 | 8/2005 |
| EP | 1624209 A2 | 2/2006 |
| EP | 1754907 A2 | 2/2007 |
| EP | 2070756 A1 | 6/2009 |
| EP | 2899421 A2 | 7/2015 |
| GB | 734449 A | 8/1955 |
| JP | S5725524 A | 2/1982 |
| JP | 2003278800 A | 10/2003 |
| JP | 2005168191 A | 6/2005 |
| JP | 2007030804 A | 2/2007 |
| JP | 2008202671 A | 9/2008 |
| JP | 2009058107 | 3/2009 |
| JP | 2009293759 A | 12/2009 |
| WO | 9101454 A1 | 2/1991 |

\* cited by examiner

ELECTROMAGNETIC CONNECT/DISCONNECT SYSTEM FOR A VEHICLE

CROSS-REFERENCE TO RELATED APPLICATIONS

This application claims the benefit of U.S. Provisional Application No. 62/187,857 filed on Jul. 2, 2015, which is incorporated by reference in its entirety herein.

FIELD OF THE INVENTION

An electromagnetic connect/disconnect system for a vehicle is described. More particularly, the device and the use of an electromagnet for engaging and disengaging driveline applications on a vehicle is described.

BACKGROUND OF THE INVENTION

Typical connect/disconnect driveline systems for vehicles push torque through a torque coupling to the secondary axle to provide enhancements in performance, handling and mobility. These systems require that the secondary axle, and the rest of the driveline, be continually rotating, which reduces the overall efficiency of the vehicle, and reduces fuel economy.

Secondary axle disconnects are available and they permit the secondary axle and prop shaft to stop rotating. These disconnect systems increase vehicle efficiency, but they can be slow to react. The systems typically use an electric motor, gear reduction and a ball screw to compress a spring that will slide a collar to engage/disengage a shaft. Reaction times on the order of two seconds are common with these systems, which is too long to be effective during most handling events.

The current systems also require power to both engage and disengage a shaft and/or remain engaged or disengaged. The latter situation may require constant power to the system, which reduces overall system efficiency. Of course, if power is lost, the system remains in its last mode. In some applications, this is acceptable, but in other applications this is not preferred.

It would be desirable for a system to maintain vehicle efficiency, and to decrease reaction time to a level appropriate to deal with vehicle handling events. It would also be desirable for a system to automatically revert to a desired mode of operation in the event of a power failure.

SUMMARY

An electromagnetic connect/disconnect system with an electromagnet including a coil and a coil housing. The system also includes a rotatable and axially slideable slide ring located between the coil housing and a sliding collar. The slide ring has a radially outer surface and a radially inner surface. The sliding collar has a first portion and a second portion. The first portion is located radially inward from the slide ring and defines a first set of axially extending teeth. The second portion is located radially inward from the first portion. A return spring is located adjacent the sliding collar. An output gear is also included which has a second set of axially extending teeth for selective engagement with the sliding collar.

PREFERRED EMBODIMENTS

It is to be understood that the invention may assume various alternative orientations and step sequences, except where expressly specified to the contrary. It is also to be understood that the specific assemblies, articles and features illustrated in the attached drawings, and described in the following specification are simply exemplary embodiments of the inventive concepts. Hence, specific dimensions, directions, or other physical characteristics relating to the embodiments disclosed are not to be considered as limiting, unless expressly stated otherwise. Also, although they may not be, like elements in various embodiments may be commonly referred to with like reference numerals within this section of the application.

Figure 1:
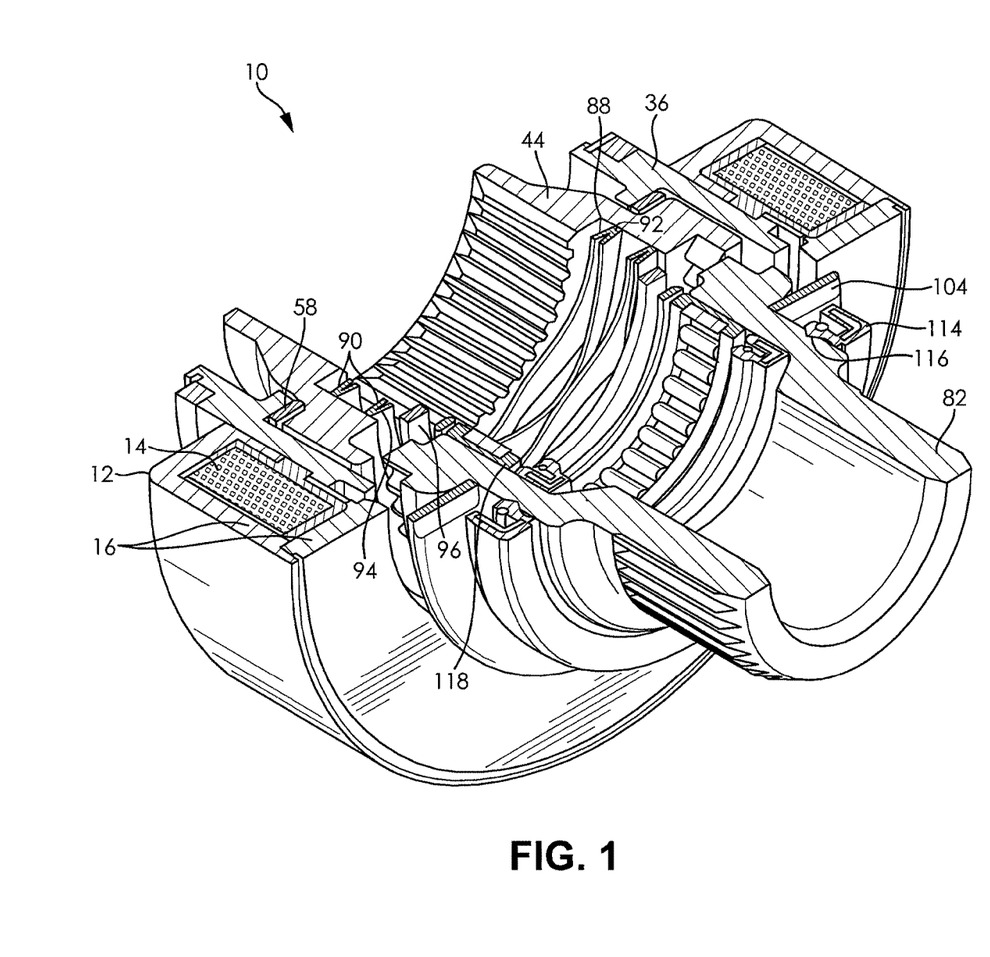
FIG. 1 is a partial cut-away perspective view of an embodiment of the system.

Turning now to FIG. 1, an electromagnetic connect/disconnect system 10 is shown. The system 10 comprises an electromagnet 12 including a coil 14 and coil housing 16. The coil housing 16 is hollow and encloses the coil 14. The coil 14 comprises multiple wire windings within the coil housing 16. The wire windings are connected to a source for electricity (not shown).

Figure 2:
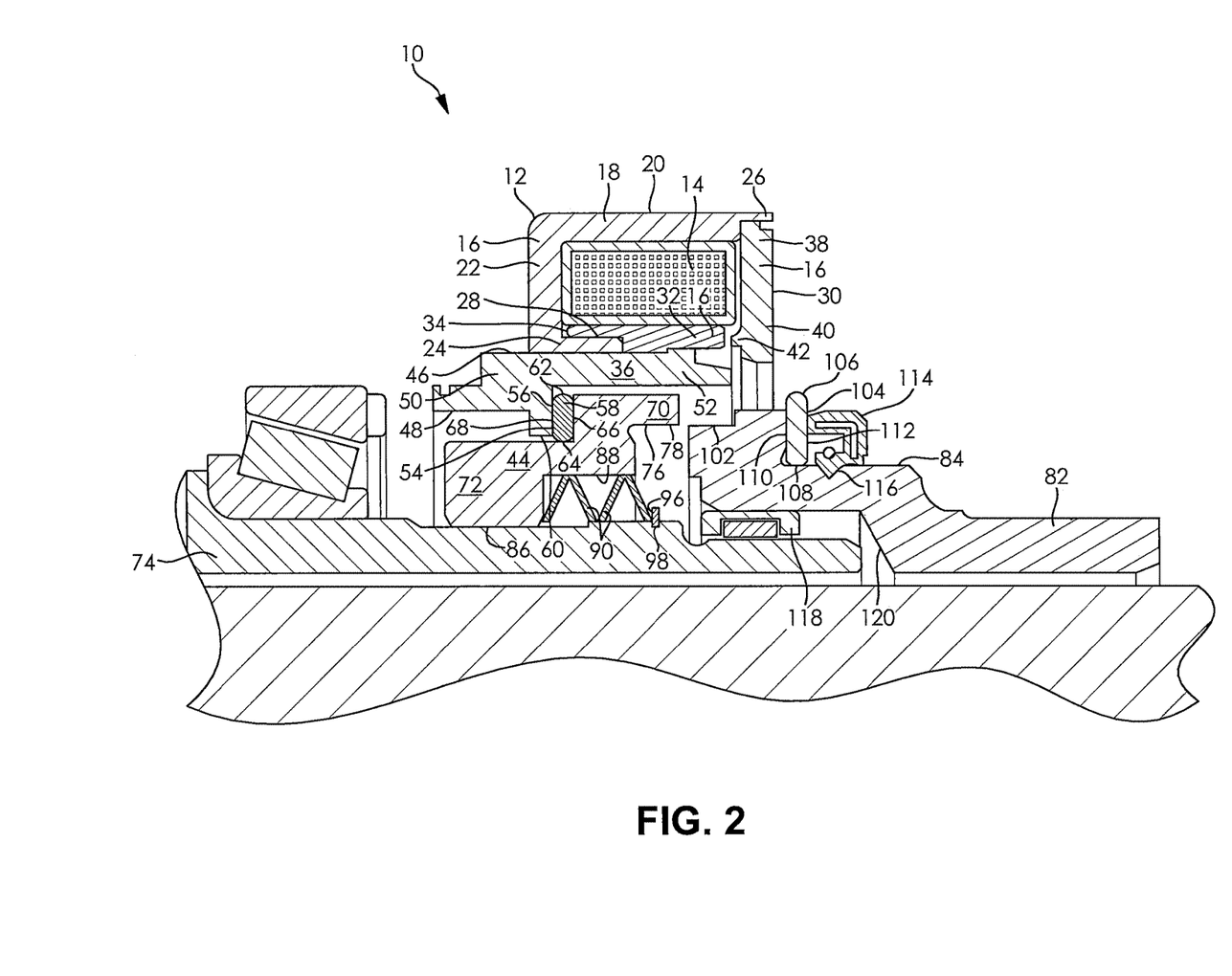
FIG. 2 is a partial, schematic side view of the embodiment in FIG. 1 in one mode of operation.

The coil housing 16 may be one piece or several pieces that have been connected together. As depicted in FIG. 2, the coil housing 16 is a stationary, three piece housing. A first piece 18 of the coil housing 16 has a generally U-shaped cross-section. The first piece of the housing has three legs 20, 22, 24. The three legs 20, 22, 24 are unitary and one-piece with one another. Two legs 20, 22 of the first piece 18 completely enclose two sides of the coil 14, with a first end 26 of one leg 20 having a generally L-shaped cross-section cut out. A second piece 28 of the coil housing 16 encloses a third side of the coil 14, and a third piece 30 of the coil housing 16 encloses the final side of the coil 14.

The second piece 28 of the coil housing 16 has a first portion 32 and a second portion 34. The first and second portions 32, 34 are unitary and one-piece with one another. The first portion 32 is thicker than the second portion 34 and is located between a sliding ring 36 and the coil 14. The second portion 34 is located between a leg 24 of the first piece 18 of the coil housing 16 and the coil 14.

The third piece 30 of the coil housing 16 has a generally rectangular cross-section and has a first end 38 and a second end 40. The first end 38 abuts the L-shaped first end 26 of a leg 20 of the first piece 18 of the coil housing 16. The second end 40 of the third piece 30 has an inwardly extending protrusion 42 that is adjacent an outside end of the first portion 32 of the second piece 28 of the coil housing 16. The three housing pieces together 18, 28, 30 substantially enclose the coil 14.

The slide ring 36 is located between the first 18 and second 28 pieces of the coil housing 16 and a sliding collar 44. More particularly, the slide ring 36 is located radially inward from the coil housing 16 and is in direct contact therewith. The slide ring 36 is constructed of a metallic material that is susceptible to magnetic forces, such as steel.

The slide ring 36 has a radially outer surface 46, a radially inner surface 48, a first end 50 and a second end 52. The outer surface 46 is in direct contact with the first and second pieces 18, 28 of the coil housing 16. The slide ring 36 has a complementary shape to the second piece 28 of the coil housing 16. More particularly, the second end 52 of the slide ring 36 may be slightly L-shaped to match a complementary L-shape on a side of the second piece 28 of the coil housing 16.

An arm 54 extends radially inward from the inner surface 48 of the slide ring 36. A first side 56 of the inwardly extending arm 54 is located axially adjacent a first bushing 58. A second side 60 of the inwardly extending arm 54 is adjacent the sliding collar 44. The slide ring 36 is adapted for selective axial movement.

The first bushing 58 is located between the slide ring 36 and the sliding collar 44. The first bushing 58 is a continuous, ring-shaped structure that has a first end 62, a second end 64, an inner surface 66 and an outer surface 68. The first end 62 of the bushing 58 is adjacent the inner surface 48 of the slide ring 36. The second end 64 of the bushing 58 is in direct axial contact with the sliding collar 44. The inner surface 66 of the bushing 58 is in direct radial contact with the sliding collar 44, and the outer surface 68 of the bushing 58 is in direct radial contact with the first side 56 of the inwardly extending arm 54 of the slide ring 36. The first bushing 58 is constructed of a non-magnetic material, such as, but not limited to, plastic.

The sliding collar 44 is located directly radially inward from the slide ring 36 and directly radially outward from an output shaft 74, and has a first portion 70 and a second portion 72. The first and second portions 70, 72 are unitary and one-piece with one another. More particularly, the first portion 70 is located directly radially inward from the slide ring 36 and extends radially outward parallel to the radially inwardly extending arm 54 of the slide ring 36. An inner surface 76 of the first portion 70 of the sliding collar 44 has a first set of axially extending teeth 78.

The second portion 72 is located radially inward from the first portion 70, and extends in an outward direction parallel with the output shaft 74. The second portion 72 defines a first set of axially extending splines 86. The splines 86 are integrally formed and unitary with the sliding collar 44 and allow for axial movement along the output shaft 74.

A return spring groove 88 as also depicted in FIGS. 1 and 2, is located radially inward from the first portion 70 of the sliding collar 44. The return spring groove 88 receives a return spring 90 therein. A first end 92 of the return spring 90 abuts an end of the return spring groove 88. A second end 94 of the return spring 90 abuts a snap ring 96.

The snap ring 96 is located in a snap ring groove 98 that extends into the output shaft 74 and an output gear 82. The snap ring 96 provides a stop for the return spring 90.

The output gear 82 is located radially inward from the slide ring 36 and radially outward from the output shaft 74. An outer surface 84 of the output gear 82 defines a second set of axially extending teeth 102 for engaging the first set of axially extending teeth 78 on the sliding collar 44. The engagement of the teeth sets 78, 102 rotationally locks the sliding collar 44 with the output gear 82.

A second bushing 104 is a continuous, ring-shaped structure and has a first end 106, a second end 108, an inner surface 110 and an outer surface 112. The second end 108 and the inner surface 110 of the second bushing 104 are both in direct contact with the outer surface 84 of the output gear 82. The outer surface 112 of the second bushing 104 abuts a second snap ring 114. The second bushing 104 is constructed of a non-magnetic material, such as, but not limited to, plastic. The second snap ring 114 is housed within a second snap ring groove 116 located on the radially outer surface 84 of the output gear 82.

A bearing 118 is located on an inner surface 120 of the output gear 82, and allows for rotation of the output shaft 74 within the output gear 82.

Figure 3:
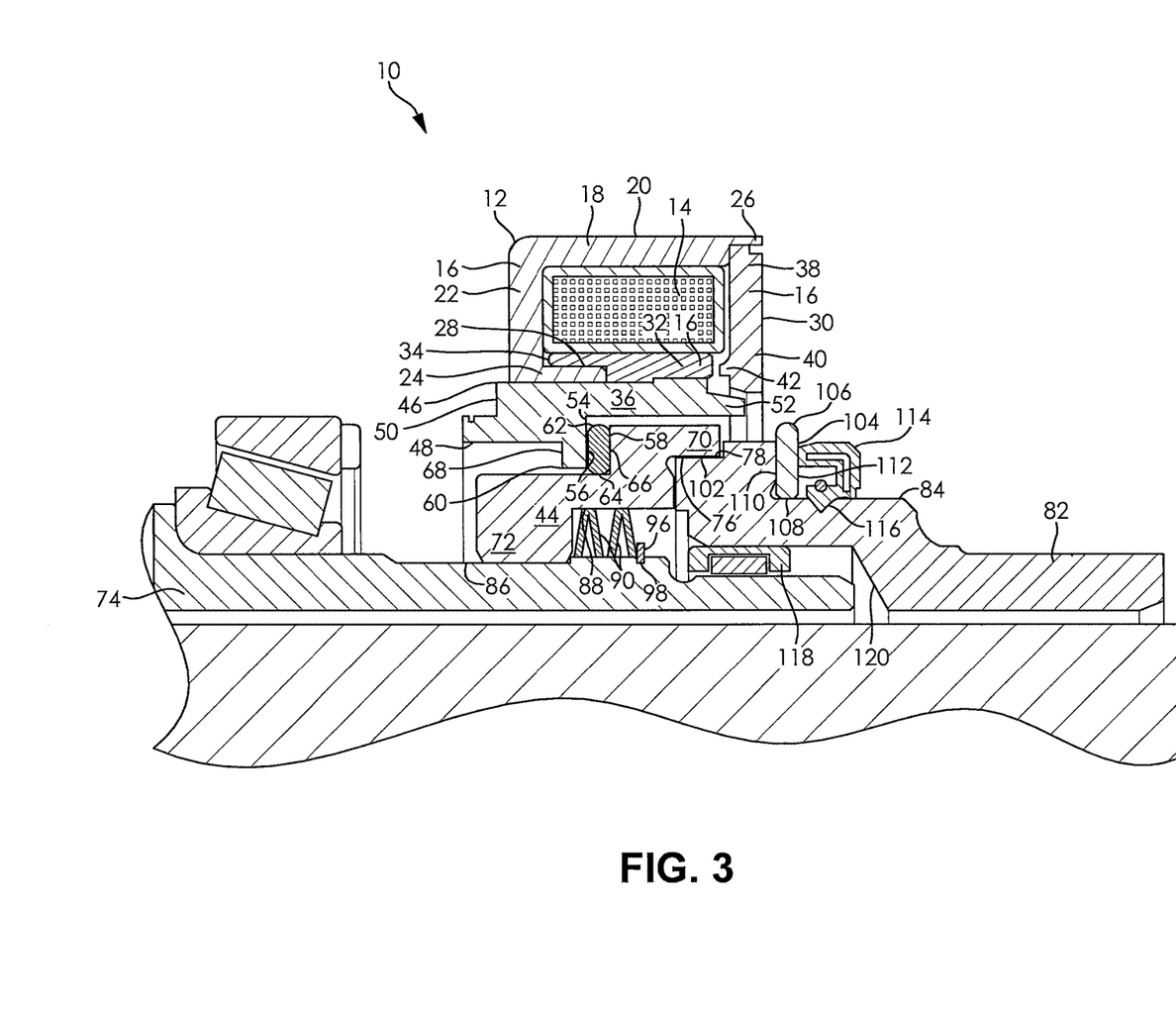
FIG. 3 is a partial, schematic side view of the embodiment in FIG. 1 in a second mode of operation.

The system has two modes of operation. In a first mode of operation as depicted in FIG. 2, the sliding collar 44 and the output gear 82 are not connected or rotating together. For a second mode of operation it is desired that they be connected so that they rotate together, as shown in FIG. 3. When the second mode of operation is to be initiated, electricity is sent to the coil 14. The coiled wires create a magnetic flux. Within a few milliseconds of the coil 14 being energized, the magnetic flux contributes to the magnetic slide ring 36 moving in the axial direction. The slide ring 36 axially moves the first bushing 58, which in turn axially moves the sliding collar 44, pushing the sliding collar 44 into engagement with the output gear 82.

In the first mode of operation, the first set of teeth 78 on the sliding collar 44 are not engaged with the second set of teeth 102 on the output gear 82; a gap separates the two sets of teeth 78, 102. However, as the second mode of operation is being engaged, the sliding collar 44 is moved, the gap separating the two sets of teeth 78, 102 closes. In a short amount of time, on the order of milliseconds, the gap is closed and the first set of teeth 78 on the sliding collar 44 engage with the second set of teeth 102 on the output gear 82. Upon engagement of the two sets of teeth 78, 102, the sliding collar 44 is rotationally fixed to the output gear 82, as depicted in FIG. 3 for the second mode of operation. The rotation from the sliding collar 44 is transferred through the output gear 82 to the output shaft 74.

When it is desired that the components no longer be engaged, the electricity to the coil 14 is interrupted. The return spring 90 pushes against the sliding collar 44 thus urging it axially away from the output gear 82. The biasing of the return spring 90 separates the two sets of teeth 78, 102. The return spring 90 permits the system 10 to default to a position where the components are not engaged. When the sliding collar 44 is not engaged with the output gear 82, the system 10 is returned to the first mode of operation as depicted in FIG. 2.

Figure 4:
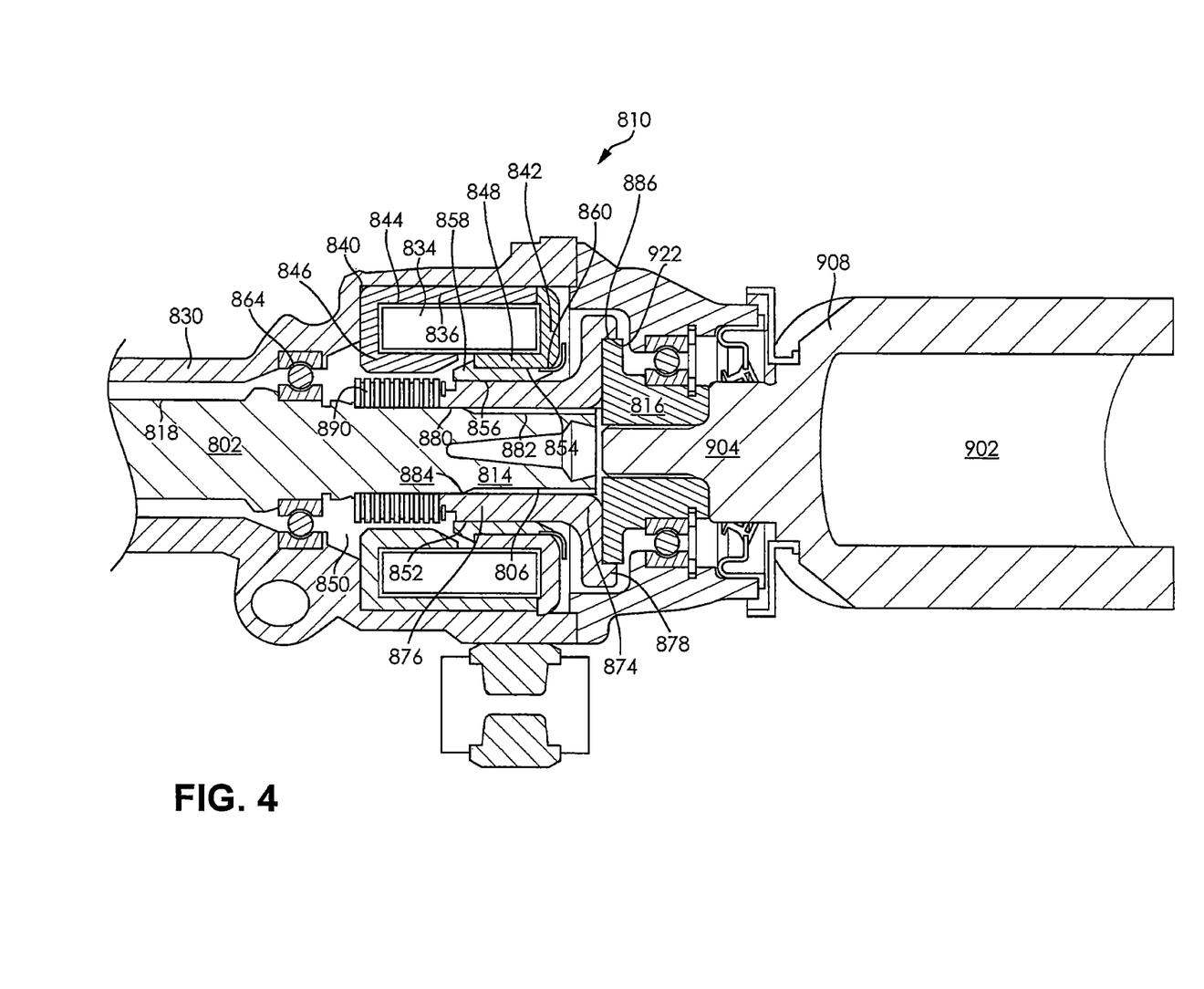
FIG. 4 is a partial, schematic side view of another embodiment of the system.

In another embodiment of the system 810 as depicted in FIG. 4, the system includes a coil 834 and a coil housing 836. The coil housing 836 is a stationary, two-piece housing. A first piece 840 of the coil housing 836 has a generally J-shaped cross-section and the second piece 842 of the coil housing 836 has a generally L-shaped cross-section. The legs 844, 846 of the J-shaped housing 840 face the L-shaped housing 842, and a leg 848 of the L-shaped housing 842 faces the J-shaped housing 840 to substantially enclose the coil 834.

The J-shaped coil housing 840 is located directly radially inward from a cover housing 830 and contacts the cover housing 830. The coil housing 836 is located radially outward from an axle output shaft 802. More particularly, the coil housing 836 is located radially outward from an axially extending wall outer surface 818. A radial distance 850 separates the coil housing 836 from the axially extending wall outer surface 818.

A slide ring 852 is located between the coil housing 836 and the axially extending wall outer surface 818. More particularly, the slide ring 852 is located radially inward from the coil housing 836 and is in direct contact therewith.

The slide ring 852 has an outer surface 854, an inner surface 856, a first end 858 and a second end 860. The outer surface 854 is in direct contact with the second piece 842 of the coil housing 836. The inner surface 856 faces the axially extending wall outer surface 818 and is in direct contact with a sliding collar 874. The first end 858 of the slide ring 852 is located adjacent a leg 846 of the first piece 840 of the coil housing 836. The slide ring 852 can rotate with the axle output shaft 802. The slide ring 852 is also adapted for selective axial movement.

The sliding collar 874 has a first portion 876 and a second portion 878. The first and second portions 876, 878 are unitary and one-piece with one another. The first portion 876 is located directly radially inward from the slide ring 852 and directly radially outward from the axle output shaft 802. The first portion 876 of the sliding collar 874 axially slides within the inner surface 856 defined by the slide ring 852.

An inner surface 880 of the first portion 876 has a first set of axially extending splines 882. The first set of axially extending splines 882 are engaged with a second set of axially extending splines 884 located on the axially extending wall outer surface 818 of the axle output shaft 802. The engagement of the splines 882, 884 rotationally locks the sliding collar 874 with the axle output shaft 802 but permits the sliding collar 874 to selectively move axially along the axle output shaft 802.

The second portion 878 of the sliding collar 874 extends in an outward radial direction away from the axle output shaft 802. The second portion 878 defines a first set of axially extending teeth 886. The teeth 886 are integrally formed and unitary with the sliding collar 874.

A return spring 890 is parallel with and adjacent an end of the first portion 876 of the sliding collar 874. A second end of the return spring 890 is fixed. For example, the second end of the return spring 890 may be fixed against an increased diameter of the axle output shaft 802. The return spring 890 is located within the radial distance gap 850.

A shaft 902 is selectively connected with the axle output shaft 802 for rotation therewith. The shaft 902 has a first male end portion 904 that is located within the hollow interior 814 of the axle output shaft 802. A sleeve 806 may be located between the hollow interior 814 of the axle output shaft 802 and the male portion 904 of the shaft 902. The sleeve 806 facilitates rotation between the two shafts 802, 902 when they are not rotating with one another.

The shaft 902 has a first increased diameter portion 908 that is unitary with the male end portion 904 and axially directly adjacent the male end portion 904. An output gear 816 is located radially outward from the male end portion 904 of the shaft 902.

The system 810, as shown, FIG. 4 has two modes of operation. In a first mode of operation (not shown) the sliding collar 874 and the output gear 816 are not connected or rotating together. For a second mode of operation it is desired that they be connected so that they rotate together, as shown in FIG. 4. When the second mode of operation is to be initiated, spring force from the return spring 890 is applied to the slide ring 852 moving it in the axial direction. The slide ring 852 axially moves, which in turn axially moves the sliding collar 874, pushing the sliding collar 874 into the output gear 816.

In the first mode of operation, the first set of teeth 886 on the sliding collar 874 teeth are not engaged with the second set of teeth 922 on the output gear 816; a gap separates the two sets of teeth 886,922. However, as the second mode of operation is being engaged, the sliding collar 874 is moved, the gap separating the two sets of teeth 886, 922 closes. In a short amount of time, on the order of milliseconds, the gap is closed and the first set of teeth 886 on the sliding collar 874 engage with the second set of teeth 922 on the output gear 816. Upon engagement of the two sets of teeth 886, 922, the sliding collar 874 is rotationally fixed to the output gear 816. The rotation from the sliding collar 874 is transferred through the output gear 816 to the shaft 902.

When it is desired that the components no longer be engaged, electricity is sent to the coil 834. The coiled wires create a magnetic flux. The magnetic flux contributes to the magnetic slide ring 852 moving in the axial direction. The slide ring 852 moves axially, which in turn axially moves the sliding collar 874 away from the output gear 816 and thus disengaging the two sets of teeth 886, 922. When the sliding collar 874 is not engaged with the output gear 816, the system 810 is returned to the first mode of operation.

In another embodiment of the system 810 described in FIG. 4, a permanent magnet may be added to the coil (not shown). The permanent magnetic flux of the magnet adds to the flux generated by the energized coil. Furthermore, the current in the coil causes the coil housing to become magnetized. The combined sum of the permanent magnetic flux, the coil flux, and the coil housing magnetism is greater than the sum of the return spring force. This combined magnetism is strong enough to hold the return spring in a compressed (disengaged) state, allowing the system to remain in the first mode of operation.

Figure 5:
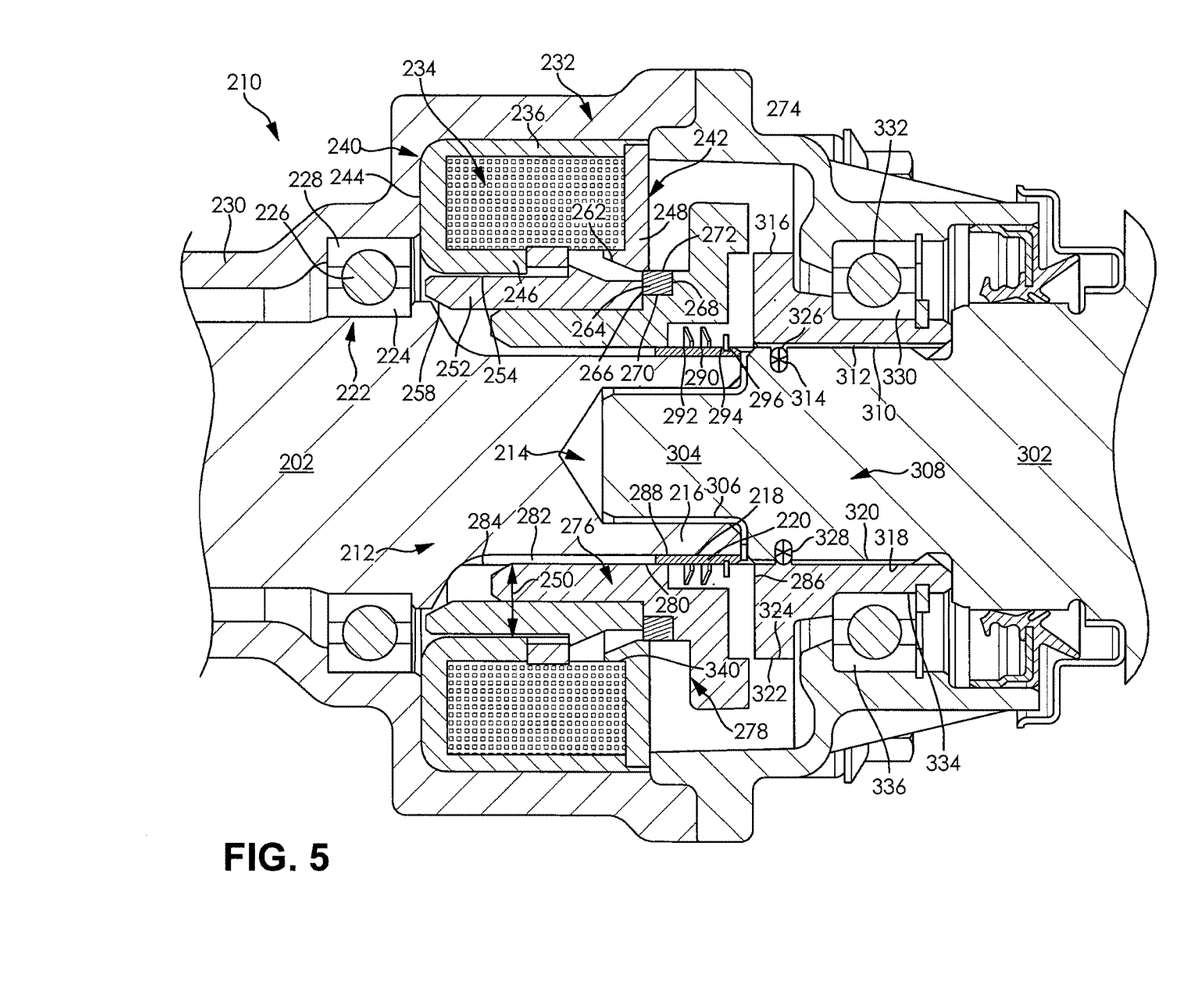
FIG. 5 is a partial, schematic side view of another embodiment of the system in one mode of operation.

In another embodiment of the system as depicted in FIG. 5, the coil housing 236 is a stationary, two-piece housing. A first piece 240 of the coil housing 236 has a generally J-shaped cross-section and the second piece 242 of the coil housing 236 has a generally L-shaped cross-section. The legs 244, 246 of the J-shaped housing 240 face the L-shaped housing 242 and a leg 248 of the L-shaped housing 242 faces the J-shaped housing 240 to substantially enclose a coil 234.

The J-shaped coil housing 240 is located directly radially inward from a cover housing 230 and contacts the cover housing 230. The coil housing 240 is located radially outward from the axle output shaft 202. More particularly, the coil housing 240 is located radially outward from an axially extending wall outer surface 218. A radial distance 250 separates the coil housing 236 from the axially extending wall outer surface 218.

A slide ring 252 is located between the coil housing 236 and the axially extending wall outer surface 218. More particularly, the slide ring 252 is located radially inward from the coil housing 236 and is in direct contact therewith.

The slide ring 252 has an outer surface 254, an inner surface 256, a first end 258 and a second end 260. The outer surface 254 is in direct contact with the first piece coil housing 240. The slide ring 252 has a complementary shape to the second piece coil housing 242. More particularly, the second end 260 of the slide ring 252 may be tapered to match a complementary tapered surface 262 on the second piece coil housing 242.

The inner surface 256 faces the axially extending wall outer surface 218. The axle output shaft 202 extends through the inner surface 256 of the slide ring 252. The first end 258 of the slide ring 252 is located axially adjacent a bearing 226. The slide ring 252 can rotate with the axle output shaft 202. The slide ring 252 is also adapted for selective axial movement. The slide ring 252 is axially adjacent a bushing 264.

The bushing 264 is a continuous, ring-shaped structure and it has the first end 266, a second end 268, an inner surface 270 and an outer surface 272. The first end 266 of the bushing 264 is in direct axial contact with the second end 260 of the slide ring 252. The second end 268 of the bushing 264 is located in direct axial contact with a sliding collar 274. The inner surface 270 of the bushing 264 is in direct radial contact with the sliding collar 274. The bushing 264 entirely encircles the sliding collar 274. The outer surface 272 of the bushing 264 is located directly radially inward from the L-shaped housing 242. The bushing 264 is constructed of a non-magnetic material, such as, but not limited to, plastic.

The bushing 264 can rotate with the axle output shaft 202, or the bushing 264 can be secured to prevent its rotation with the axle output shaft 202. It may be desirable to secure the bushing 264 to prevent rotation with the axle output shaft 202 if it interferes with the system, described below. In the depicted embodiment, the bushing 264 can rotate with the axle output shaft 202.

The sliding collar 274 has a first portion 276 and a second portion 278. The first and second portions 276, 278 are unitary and one-piece with one another. The first portion 276 is located directly radially inward from the slide ring 236 and directly radially outward from the axle output shaft 202. The first portion 276 of the sliding collar 274 axially slides within the inner surface 256 defined by the slide ring 252.

An inner surface 280 of the first portion 276 has a first set of axially extending splines 282. The first set of axially extending splines 282 are engaged with a second set of axially extending splines 284 located on the outer surface 218 of the axially extending wall 216 of the axle output shaft 202. The engagement of the splines 282, 284 rotationally locks the sliding collar 274 with the axle output shaft 202 but permits the sliding collar 274 to selectively move axially along the axle output shaft 202.

The second portion 278 of the sliding collar 274 extends in an outward radial direction away from the axle output shaft 202. The second portion 278 defines a first set of axially extending teeth 286. The teeth 286 are integrally formed and unitary with the sliding collar 274.

A return spring groove 288 is located radially inward in the second portion 278, adjacent the axle output shaft 202. The return spring groove 288 receives a return spring 290 therein. A first end 292 of the spring 290 abuts an end of the groove 288. A second end 294 of the spring 290 abuts a snap ring 296.

The snap ring 296 is also located in a second snap ring groove 300 that extends into the axle output shaft 202. The snap ring 296 retains the sliding collar 294 by providing a stop for the spring 290.

A shaft 302 is selectively connected with the axle output shaft 202 for rotation therewith. The shaft 302 has a first male end portion 304 that is located within the hollow interior 214 of the axle output shaft 202. A sleeve 306 may be located between the hollow interior 214 of the axle output shaft 202 and the male portion 304 of the shaft 302. The sleeve 306 facilitates rotation between the two shafts 202, 302 when they are not rotating with one another.

The shaft 302 has a first increased diameter portion 308 that is unitary with the male end portion 304 and axially directly adjacent the male end portion 304. An outer surface 310 of the increased diameter portion 308 has a set of axially extending splines 312, and a radial groove 314 extending through the spline set 312.

An output gear 316 is located radially outward from the increased diameter portion 308 of the shaft 302. More particularly, an inner radial surface 318 of the output gear 316 defines a set of splines 320 meshed with the shaft splines 312. The splines 312, 320 rotationally fix the output gear 316 to the shaft 302. A second set of radially extending teeth 322 extend along a side surface 324 of the output gear 316.

A groove 326 radially extends into the output gear splines 320. A snap ring 328 is located in the output gear groove 326 and the shaft groove 314 to axially fix the output gear 316 and the shaft 302.

An inner race 330 of a bearing 332 is located on an outer surface 334 of the output gear 316. An outer race 336 of the bearing 332 is located in direct contact with the housing 230. The bearing 332 facilitates rotation of the output gear 316 with respect to the stationary housing 230.

Figure 6:
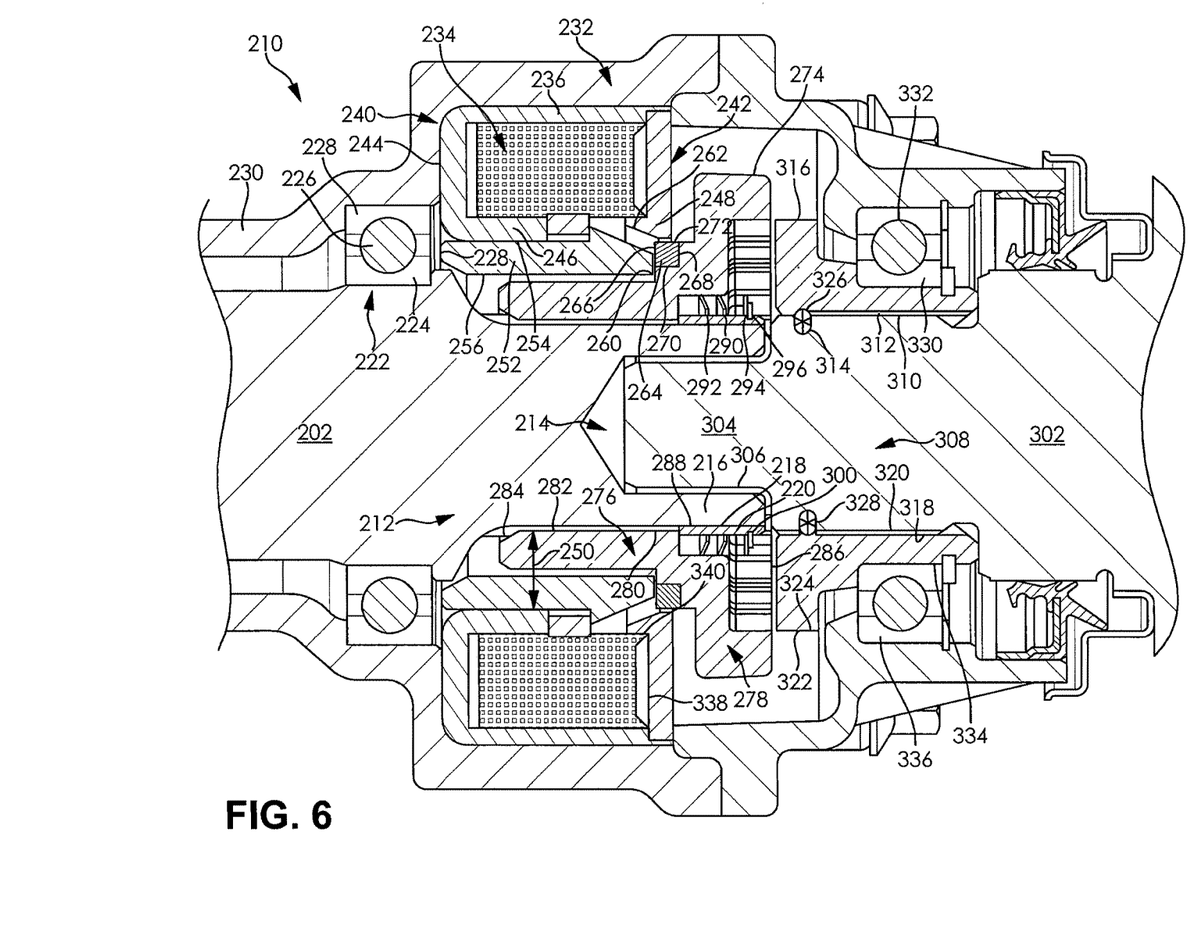
FIG. 6 is a partial, schematic side view of the embodiment in FIG. 5 in a second mode of operation.

The system has two modes of operation. In a first mode of operation as depicted in FIG. 5, the sliding collar 274 and the output gear 316 are not connected or rotating together. For a second mode of operation it is desired that they be connected so that they rotate together, as shown in FIG. 6. When the second mode of operation is to be initiated, electricity is sent to the coil 234. The coiled wires create a magnetic flux. Within a few milliseconds of the coil 234 being energized, the magnetic flux contributes to the magnetic slide ring 252 moving in the axial direction. The slide ring 252 axially moves the bushing 264, which in turn axially moves the sliding collar 274, pushing the sliding collar 274 into output gear 316.

In the first mode of operation, the first set of teeth 286 on the sliding collar 274 teeth are not engaged with the second set of teeth 322 on the output gear 316; a gap separates the two sets of teeth 286, 322. However, as the second mode of operation is being engaged, the sliding collar 274 is moved, the gap separating the two sets of teeth 286, 322 closes. In a short amount of time, on the order of milliseconds, the gap is closed and the first set of teeth 286 on the sliding collar 274 engage with the second set of teeth 322 on the output gear 316. Upon engagement of the two sets of teeth 286, 322, the sliding collar 274 is rotationally fixed to the output gear 316, as depicted in FIG. 6. The rotation from the sliding collar 274 is transferred through the output gear 316 to the shaft 302.

When it is desired that the components no longer be engaged, the electricity to the coil 234 is interrupted. The return spring 290 pushes against the sliding collar 274 thus urging it axially away from the output gear 316. The biasing of the return spring 290 separates the two sets of teeth 286, 322. The return spring 290 permits the system 210 to default to a position where the components are not engaged. When the sliding collar 274 is not engaged with the output gear 316, the system 210 is returned to the first mode of operation as depicted in FIG. 5.

In another embodiment the systems 10, 210 described above may include a permanent magnet (not shown) located on a side of the coil 14, 234. The permanent magnetic flux of the permanent magnet adds to the flux generated by the energized coil 14, 234. Furthermore, the current in the coil 14, 234 causes the coil housing 16, 240 to become magnetized. The sum of the permanent magnetic flux, the coil flux, and the housing magnetism is greater than the sum of the return spring 90, 290 force and friction force of the slide ring 36, 252, which causes the slide ring 36, 252 to move.

The permanent flux from the permanent magnet and/or coil housing 16, 240 is strong enough to hold the first set of teeth 78, 286 of the sliding collar 44, 274 in engagement with second set of teeth 102, 322 on the output gear 82, 316. Therefore, if power is lost to the coil 14, 234, the output shaft 74, 202 will stay in the engaged position. Additionally, the system 10, 210 does not require power to stay in the engaged position. This is advantageous since it can operate in the engaged position without continuing to draw electrical power, which makes the system more efficient.

When it is desired that the component no longer be engaged, a current is provided to the coil 14, 234 to create a flux in the opposite direction. The flux would cancel the flux from the permanent magnet and/or demagnetize the coil housing 16, 240. The return spring 90, 290 pushes against the sliding collar 44, 274 thus urging it axially away from the output gear 82, 316. The biasing of the return spring 90, 290 separates the two sets of teeth 78, 286; 102, 322.

The system does not require power to stay in the disengaged position. This is advantageous since it can operate in the disengaged position without continuing to draw electrical power, which makes the system more efficient.

It can be appreciated that one embodiment of the system described and depicted herein is for an axle connect/disconnect system. However, the device described herein is not limited to just axles. Instead, the device can be applied to other devices, equipment and methods including, but not limited to, power take off units.

Figure 7:
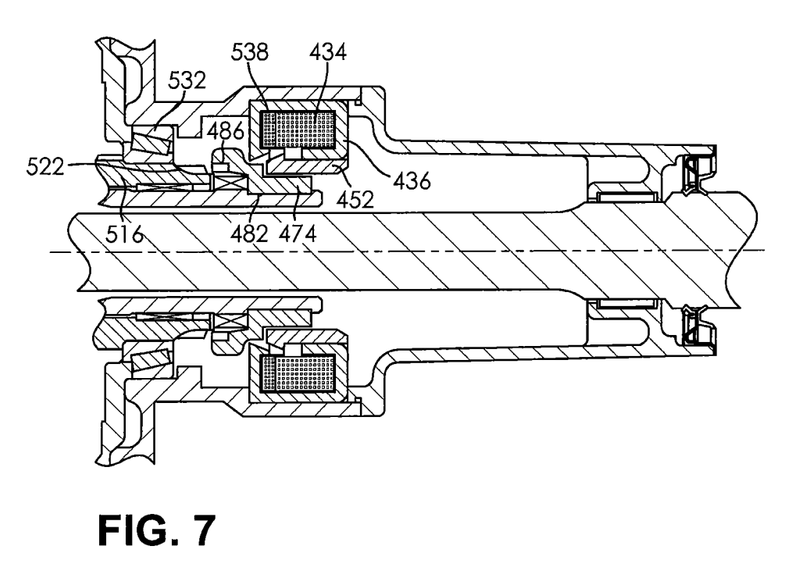
FIG. 7 is a partial, schematic side view of another embodiment of the system.

FIG. 7 depicts one embodiment of a power take off unit utilizing the system described herein. Provided is a coil 434 and a coil housing 436. The coil housing 436 also housing a permanent magnet 538 therein. Radially inboard of the housing 436 is a slide ring 452. Radially inboard of the slide ring 452 is a sliding collar 474. The sliding collar 474 has teeth 486 on one end portion. The other end portion of the sliding collar 474 has splines 482 that engage with shaft splines. The teeth 486 are complimentary to and selectively engage teeth 522 on an output gear 516. The output gear 516 is mounted on a bearing 532 to permit the gear 516 to rotate with respect to a housing. The power take off unit functions in the same way as the axle system described above.

Figure 8:
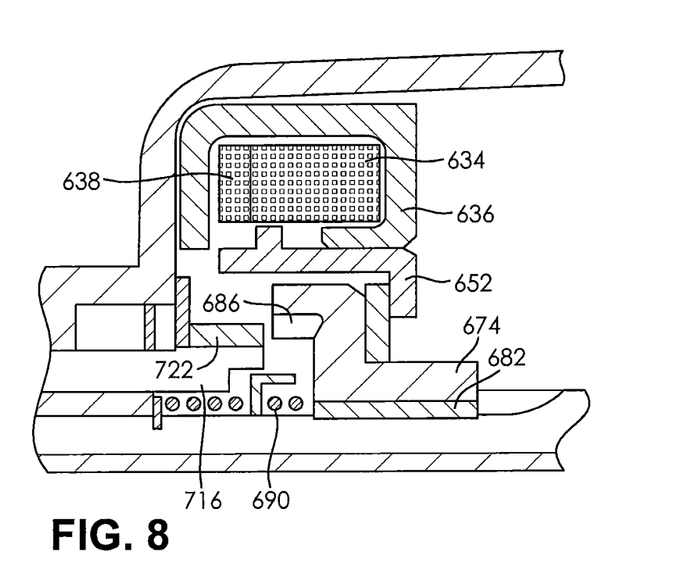
FIG. 8 is a partial, schematic side view of another embodiment of the system.

FIG. 8 depicts another embodiment of a power take off unit also utilizing the system described herein. Provided is a coil 634 and a coil housing 636. The coil housing 636 also housing a permanent magnet 638 therein. Radially inboard of the housing 636 is a slide ring 652. Radially inboard of the slide ring 652 is a sliding collar 674. The sliding collar 674 has teeth 686 on one end portion. The other end portion of the sliding collar 674 has splines 682 that engage with shaft splines. The teeth 686 are complimentary to and selectively engage teeth 722 on an output gear 716. A return spring 690 pushes against the sliding collar 674 urging it away from the output gear 716. The power take off unit functions in the same way as the axle system described above.

From the foregoing detailed description, it will be apparent that various modifications, additions, and other alternative embodiments are possible without departing from the true scope and spirit. The embodiments discussed herein were chosen and described to provide the best illustration of the principles of the invention and its practical application to thereby enable one of ordinary skill in the art to use the invention in various embodiments and with various modifications as are suited to the particular use contemplated. As should be appreciated, all such modifications and variations are within the scope of the invention.

What is claimed is:

1. An electromagnetic connect/disconnect system, comprising:
   an electromagnet comprising a coil and a coil housing;
   a rotatable and axially slidable slide ring located between said coil housing and a sliding collar, said slide ring comprising a radially outer surface, a radially inner surface, a first end and a second end;
   said sliding collar comprising a first portion and a second portion, said first portion is located directly radially inward from said slide ring, said first portion defining a first set of axially extending teeth, said second portion is located radially inward from said first portion;
   a return spring; and
   an output gear comprising a second set of axially extending teeth for selective engagement with said first set of axially extending teeth of said sliding collar,
   wherein said return spring is configured to axially move said sliding collar to engage said first set of axially extending teeth of said sliding collar with said second set of axially extending teeth of said output gear.

2. An electromagnetic connect/disconnect system according to claim 1, wherein said return spring is parallel with and adjacent an end of said first portion of said sliding collar.

3. An electromagnetic connect/disconnect system according to claim 1, wherein said coil housing is a three-piece housing.

4. An electromagnetic connect/disconnect system according to claim 3, wherein one piece of said coil housing is a U-shaped cross-section.

5. An electromagnetic connect/disconnect system according to claim 3, wherein one piece of said coil housing comprises a first portion and a second portion and said first portion is thicker than said second portion.

6. An electromagnetic connect/disconnect system according to claim 1, wherein said second end of said slide ring is L-shaped to match a complementary L-shape on a side of said coil housing.

7. An electromagnetic connect/disconnect system according to claim 1, wherein an arm extends radially inward from said radially inner surface of said slide ring and said first portion of said sliding collar extends radially outward parallel to said slide ring radially inwardly extending arm.

8. An electromagnetic connect/disconnect system according to claim 1, wherein a bushing is located between said slide ring and said sliding collar.

9. An electromagnetic connect/disconnect system according to claim 1, wherein said output gear is located radially inward from said slide ring and radially outward from an output shaft.

10. An electromagnetic connect/disconnect system according to claim 1, wherein said coil housing is a two-piece housing.

11. An electromagnetic connect/disconnect system according to claim 10, wherein one piece of said coil housing is a J-shaped cross-section.

12. An electromagnetic connect/disconnect system according to claim 10, wherein one piece of said coil housing is a L-shaped cross-section.

13. An electromagnetic connect/disconnect system according to claim 10, wherein said slide ring has a complementary shape to one piece of said coil housing.

14. An electromagnetic connect/disconnect system according to claim 1, wherein said electromagnet comprises a permanent magnet.

* * * * *